(12) United States Patent
Villette et al.

(10) Patent No.: US 12,358,839 B2
(45) Date of Patent: Jul. 15, 2025

(54) COMPOSITION AND METHOD FOR MANUFACTURING A HIGH DUCTILITY FIBER REINFORCED POLYMER REBAR

(71) Applicant: SAUDI ARABIAN OIL COMPANY, Dhahran (SA)

(72) Inventors: Thibault Tarik Villette, Belfort (FR); Waleed Al Nasser, Ad Dammam (SA); Abdullatif Jazzar, Khobar (SA); Mohammed Al Mehthel, Dhahran (SA); Oscar Salazar, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 557 days.

(21) Appl. No.: 17/659,264

(22) Filed: Apr. 14, 2022

(65) Prior Publication Data
US 2023/0331629 A1   Oct. 19, 2023

(51) Int. Cl.
| | | |
|---|---|---|
| *C04B 14/38* | (2006.01) | |
| *C04B 14/42* | (2006.01) | |
| *C04B 16/06* | (2006.01) | |
| *C04B 26/06* | (2006.01) | |
| *C04B 111/00* | (2006.01) | |

(52) U.S. Cl.
CPC .......... *C04B 14/386* (2013.01); *C04B 14/42* (2013.01); *C04B 16/0683* (2013.01); *C04B 26/06* (2013.01); *C04B 2111/00379* (2013.01); *C04B 2111/00905* (2013.01); *C04B 2201/50* (2013.01)

(58) Field of Classification Search
CPC ......... C04B 14/38; C04B 26/06; C04B 16/06; C04B 14/42; C04B 14/386; C04B 2111/00905
See application file for complete search history.

(56) References Cited

U.S. PATENT DOCUMENTS

| | | | |
|---|---|---|---|
| 1,003,973 | A | 9/1911 | Barrickman |
| 1,331,776 | A | 2/1920 | Lewis |
| 3,617,078 | A | 11/1971 | Valukonis |

(Continued)

FOREIGN PATENT DOCUMENTS

| | | |
|---|---|---|
| CN | 103669725 A | 3/2014 |
| CN | 102900200 B | 2/2015 |

(Continued)

OTHER PUBLICATIONS

JP06041755 English translation prepared Dec. 5, 2024 (Year: 2024).*

(Continued)

*Primary Examiner* — Alison L Hindenlang
*Assistant Examiner* — Shibin Liang
(74) *Attorney, Agent, or Firm* — Osha Bergman Watanabe & Burton LLP

(57) ABSTRACT

A fiber reinforced polymer rebar composition and a method of forming the rebar composition is described. The method includes the steps of feeding a first fiber and a second fiber simultaneously through a preforming guide into a resin impregnator, pulling the fibers through the liquid polymeric resin in the resin impregnator to form a resin-soaked hybrid fiber, and passing the resin-soaked hybrid fiber through a heated stationary die where the resin of the resin-soaked hybrid fiber undergoes polymerization and cross-linking.

12 Claims, 6 Drawing Sheets

(56) References Cited

U.S. PATENT DOCUMENTS

| | | | |
|---|---|---|---|
| 3,679,250 | A | 7/1972 | Marsden |
| 3,850,535 | A | 11/1974 | Howlett et al. |
| 4,127,354 | A | 11/1978 | Mixon, Jr. |
| 4,143,986 | A | 3/1979 | Antosh |
| 4,400,424 | A * | 8/1983 | Hatada .................. D06M 10/10 |
| | | | 8/444 |
| 4,469,465 | A | 9/1984 | Andrus |
| 4,983,453 | A * | 1/1991 | Beall ..................... B29C 70/083 |
| | | | 442/415 |
| 5,098,216 | A | 3/1992 | Caperton |
| 5,193,932 | A | 3/1993 | Wu |
| 5,407,292 | A | 4/1995 | Collins |
| 5,439,309 | A | 8/1995 | Raz |
| 5,491,941 | A | 2/1996 | Lancelot, III |
| 5,681,126 | A | 10/1997 | Lin |
| 5,919,205 | A | 7/1999 | Heimberger et al. |
| 5,967,691 | A | 10/1999 | Lancelot, III |
| 6,041,755 | A | 3/2000 | Mashiki |
| 6,265,065 | B1 | 7/2001 | McCallion |
| 7,045,210 | B2 | 5/2006 | Bleibler |
| 9,212,714 | B2 | 12/2015 | Shigematsu et al. |
| 10,343,311 | B2 | 7/2019 | Schinkinger |
| 2003/0231925 | A1 | 12/2003 | Chen |
| 2007/0175167 | A1 | 8/2007 | Allen et al. |
| 2008/0060298 | A1 | 3/2008 | Fahim et al. |
| 2009/0145074 | A1 | 6/2009 | Tsukamoto |
| 2010/0031607 | A1 | 2/2010 | Oliva et al. |
| 2011/0308198 | A1 | 12/2011 | Comerford |
| 2013/0028658 | A1 | 1/2013 | Yee |
| 2013/0092316 | A1* | 4/2013 | Pakal .................... B29C 70/523 |
| | | | 425/461 |
| 2014/0010590 | A1 | 1/2014 | Stewart et al. |
| 2016/0208492 | A1 | 7/2016 | Kim |
| 2021/0138740 | A1* | 5/2021 | Kiilunen ............... B29C 70/523 |

FOREIGN PATENT DOCUMENTS

| | | | |
|---|---|---|---|
| CN | 211473089 U | 9/2020 | |
| DE | 4018042 A1 | 12/1991 | |
| EP | 2756142 | 7/2014 | |
| JP | 06041755 * | 2/1994 | ............. C23C 16/50 |
| KR | 20010028610 A | 4/2001 | |
| KR | 100791360 B1 | 1/2008 | |
| KR | 100940550 B1 | 2/2010 | |
| KR | 101221322 B1 | 1/2013 | |
| KR | 20170110806 A | 10/2017 | |

OTHER PUBLICATIONS

Office Action issued Dec. 28, 2022 in corresponding Saudi Arabian Patent Application No. 122431280, with English Machine Translation, 13 pages.

ASTM International, "Standard Specification for Solid Round Glass Fiber Reinforced Polymer Bars for Concrete Reinforcement"; Designation: ASTM D7957/D7957M-17; pp. 1-5; 2017 (5 pages).

Aly, Ragi et al., "Tensile Lap Splicing of Fiber-Reinforced Polymer Reinforcing Bars in Concrete"; ACI Structural Journal; vol. 103, Issue 6, Title No. 103-S87; pp. 857-864; Nov.-Dec. 2006 (8 pages).

Yuan, Guoqing et al., "A Review on the Connection of FRP Bars"; Applied Mechanics and Materials; vol. 238; pp. 61-65; Nov. 29, 2012 (5 pages).

ACI Committee 440, "Guide for the Design and Construction of Structural Concrete Reinforced with Fiber-Reinforced Polymer (FRP) Bars"; ACI 440.1R-15; pp. 1-83; Mar. 2015 (88 pages).

Moment, "Mechanical Splices vs Lap Splicing"; May 8, 2018; < https://www.moment-solutions.com/mechanical-splices-vs-lap-splicing/>; Accessed Jun. 15, 2020 (6 pages).

Ebnesajjad, Sina, "Characteristics of Adhesive Materials"; Handbook of Adhesives and Surface Preparation; Technology, Applications and Manufacturing, Plastics Design Library; Chapter 8; pp. 137-183; 2011 (47 pages).

Al-Neshawy, Fahim, "Reinforcing steel and composite materials"; CIV-E1010 Building Materials Technology (5 cr); ecture 11; pp. 1-20 (20 pages).

Yuan, G. et al., "Study of Coaxial FRP Sleeve / Expansion Cement Connection of FRP Rebars"; Proceedings of the 18th International Conference on Composite Materials; Aug. 21-26, 2011 (4 pages).

ERICO International Corporation, "In-Situ Rebar Splice meets Ultimate Splice requirements."; Apr. 29, 2008; <https://news.thomasnet.com/fullstory/in-situ-rebar-splice-meets-ultimate-splice-requirements-543651>; Accessed Mar. 14, 2021 (5 pages).

Concrete Reinforcing Steel Institute, "Splicing Bar"; <https://www.crsi.org/index.cfm/steel/splices>; Accessed Mar. 14, 2021 (5 pages).

Lancelot, Harry B., "Mechanical splices of reinforcing bars", Concrete Construction; Jan. 1, 1985 (5 pages).

ACI Committee 439, "Mechanical Connections of Reinforcing Bars", International Concrete Abstracts Portal, Technical Documents; ACI 439.3R-91; pp. 439.3R-1-439.3R-16; 1999 (16 pages).

Dayton Superior, "Rebar Splicing Handbook"; Concrete Construction Products; Jul. 2018 (72 pages).

Office Action Issued in Corresponding U.S. Appl. No. 17/362,527, dated Jul. 20, 2022, 21 pages.

Al-Neshawy, Fahim, "Reinforcing steel and composite materials", CIV-E1010 Building Materials Technology (5 cr), Lecture 11, Aalto University School of Engineering, pp. 1-20 (20 pages).

Aly, Ragi, et al., "Tensile Lap Splicing of Fiber-Reinforced Polymer Reinforcing Bars in Concrete", Title No. 103-S87, ACI Structural Journal, American Concrete Institute, vol. 103, No. 6, Nov.-Dec. 2006, pp. 857-864 (8 pages).

"An ultra-strong performance film", Teijin, Endumax, Date Accessed: Apr. 13, 2022, URL: https://www.teijinaramid.com/wp-content/uploads/2011/07/20003-Brochure-Endumax_LR.pdf> (9 pages).

Chukov, Dilyus, et al., "Comparison between self-reinforced composites based on ultra-high molecular weight polyethylene fibers and isotropic UHMWPE", Mendeleev Communications, ScienceDirect, Elsevier, vol. 30, 2020, pp. 49-51 (3 pages).

Ebnesajjad, Sina, "8: Characteristics of Adhesive Materials"; Handbook of Adhesives and Surface Preparation, Elsevier Inc., 2011, pp. 137-183 (47 pages).

Elsayed, Tarek A., et al., "Hybrid Fiber Reinforced Polymers Rebars", Journal of Advanced Materials, Jan. 2011, URL: <https://www.researchgate.net/publication/283595362, 2011> (29 pages).

Gulshan, Fahmida, "Ductility in steel reinforcement", Presentation, Jul. 1, 2013 (30 pages).

"In-Situ Rebar Splice meets Ultimate Splice requirements.", ERICO International Corporation, Apr. 29, 2008, Date Accessed: Mar. 14, 2021, URL :<https://news.thomasnet.com/fullstory/in-situ-rebar-splice-meets-ultimate-splice-requirements-543651>; (5 pages).

Lancelot, Harry B., "Mechanical splices of reinforcing bars", Publication #C850023, Concrete Construction, The Aberdeen Group, Jan. 1, 1985 (5 pages).

Lees, J.M., et al., "Expansive cement couplers: A means of pre-tensioning fibre-reinforced plastic tendons", Constructions and Building Materials, vol. 9, No. 6, Elsevier Science Ltd, 1995, pp. 413-423 (12 pages).

McDermott, John F., et al. "Mechanical Connections of Reinforcing Bars", 439.3R-91, ACI Structural Journal, ACI Committee 439, vol. 88, No. 2, Mar.-Apr. 1991, Reapproved 1999, pp. 439.3R-1-437.3R-16 (16 pages).

"Mechanical Slices vs LAP Splicing", Moment, Leviat: A CRH Company, May 8, 2018, Date Accessed: Jun. 25, 2020, URL: <https://www.moment-solutions.com/mechanical-splices-vs-lap-splicing/>, pp. 1-6 (6 pages).

Office Action issued in related U.S. Appl. No. 17/362,527, mailed Jan. 21, 2022 (15 pages).

Peijs, Ton, "High Performance Polyethylene Fibers", Comprehensive Composite Materials II, Elsevier Ltd., vol. 1, 2018, pp. 86-126 (41 pages).

"Rebar Splicing Handbook", Concrete Construction Products, Dayton Superior, Jul. 2018 (72 pages).

Shield, Carol K. et al., "Guide for the Design and Construction of Structural Concrete Reinforced with Fiber-Reinforced Polymer (FRP) Bars"; ACI 440.1R-15, ACI Committee 440, American Concrete Institute, Mar. 2015, pp. 1-83 (88 pages).

(56) References Cited

OTHER PUBLICATIONS

"Splicing Bar", Concrete Reinforcing Steel Institute, Date Accessed: Mar. 14, 2021, URL: <https://www.crsi.org/index.cfm/steel/splices> (5 pages).
"Standard Specification for Solid Round Glass Fiber Reinforced Polymer Bars for Concrete Reinforcement", Designation: ASTM D7957/D7957M-17, ASTM International, 2017, pp. 1-5 (5 pages).
"Ultra High Molecular Weight Polyethylene Fiber from DSM Dyneema", DSM, Dyneema, Jul. 1, 2016 (4 pages).
Yuan, Guoqing, et al., "A Review on the Connection of FRP Bars", Applied Mechanics and Materials, Trans Tech Publications, vol. 238, Nov. 29, 2012, pp. 61-65 (5 pages).
Yuan, G. et al., "Study of Coaxial FRP Sleeve / Expansion Cement Connection of FRP Rebars"; Paper ID M6-4-IF1287, 18th International Conference on Composite Materials; Aug. 2011 (4 pages).
Office Action issued by the Saudi Arabian Patent Office for corresponding Saudi Arabian patent application No. 123446927, mailed Jan. 25, 2025 (18 pages).

\* cited by examiner

COMPOSITION AND METHOD FOR MANUFACTURING A HIGH DUCTILITY FIBER REINFORCED POLYMER REBAR

BACKGROUND

Reinforced concrete (RC) is a composite material in which concrete's relatively low tensile strength and ductility are improved by the inclusion of reinforcement having higher tensile strength or ductility. RC used extensively in construction. Unreinforced concrete is not suitable for most construction projects because it cannot withstand the stresses created by vibrations, wind, or other forces. Reinforced materials are embedded in the concrete in such a way that the two materials resist the applied forces together. The compressive strength of concrete and the tensile strength of steel form a strong synergy to resist these stresses over a long span.

A reinforcing bar (rebar) is typically formed from ridged carbon steel; the ridges give frictional adhesion to the concrete and prevent the rebars from being pulled out of the concrete. Although concrete is very strong in compression, it is virtually without strength in tension. To compensate for this, rebars are embedded into it to carry the tensile loads on a structure. While any material with sufficient tensile strength could be used to reinforce concrete, steel is used in concrete as they both have similar coefficients of thermal expansion. This means that a concrete structural element reinforced with steel will experience minimal stress when there is a change in temperature as the two interconnected materials will expand/contract in a similar manner.

The most basic and inexpensive form of rebar consists of simple steel bars. While effective at boosting internal strength, plain steel rebars often corrode as times goes on. As rust forms on the outside of the embedded rebar, it exerts an increasing amount of pressure on the surrounding concrete, which leads to reducing the bonding strength between the two. Such internal pressure can cause the concrete slab to spontaneously crack, while also making the concrete much more vulnerable to damage caused by blows and compressive forces. The surface of the concrete may develop patches of spalling, creating rough, unattractive areas as the concrete chips and flakes away.

Fiber Reinforced Polymer (FRP) rebars have been developed as a non-corrosive alternative to steel in concrete reinforcement and are suitable for any structural or architectural application where a material that is corrosion resistant, lightweight, or non-conductive is required. FRP rebar is comprised of two elements; a fiber (usually carbon, glass, aramid, or basalt) and a resin (polyester, epoxy, or vinyl ester). The most common example of FRP rebars are Glass Fiber Reinforced Polymer (GFRP) Rebars or Carbon Fiber Reinforced Polymer (CFRP) Rebars.

Composite rebars such as GFRP and CFRP tend to be brittle. The ductility of rebar is a property that increases safety as its onset gives a warning about a potential collapse of a construction component. If these safety factors are improved, the cost of the construction will decrease. Accordingly, there exists a need for a rebar with immunity to corrosion, high strength, lightweight, and high ductility.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of forming of a fiber reinforced polymer rebar composition including the steps of feeding a first and a second fiber simultaneously into a resin impregnator, pulling the fibers through a liquid polymeric resin in the resin impregnator to for a resin-soaked hybrid fiber, and lastly passing the resin-soaked hybrid fiber through a heated stationary die.

In another aspect, embodiments disclosed herein relate to a rebar formed using the aforementioned method.

Other aspects and advantages of the claimed subject matter will be apparent from the following description and the appended claims.

DETAILED DESCRIPTION

Figure 1A:
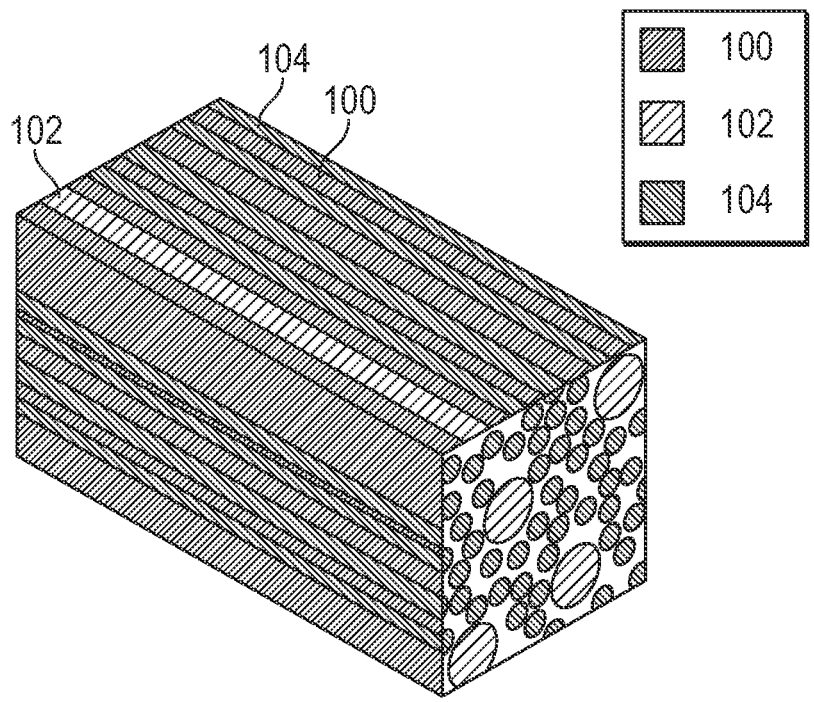
FIG. 1A is an illustration of the microstructure of a HD-FRP in accordance with one or more embodiments of the present disclosure.

Embodiments of the present disclosure generally relate to a fiber reinforced polymer rebar composition with high ductility and a method to fabricate the fiber reinforced polymer rebar for the reinforcement of concrete structures. The fiber reinforced polymer (FRP) rebar is referred to herein as a high-ductility-FRP rebar (HD-FRP) and improves civil construction safety. HD-FRP rebars have higher tensile strength, ductility and toughness compared to conventional fiber rebars.

The HD-FRP rebar comprises a polymer and at least two fibers, a first and a second fiber. A key component of the disclosed HD-FRP is that one of the fibers used for reinforcement may be a polymer fiber, such as ultra-high-molecular weight polyethylene.

The method of making the HD-FRP is a co-pultrusion process. The method may include feeding a first fiber and a second fiber simultaneously into a liquid polymeric resin impregnator, thereby forming a hybrid fiber, pulling the fibers through the liquid polymeric resin in the resin impregnator to form a resin-soaked hybrid fiber, and passing the resin-soaked hybrid fiber through a heated stationary die, where resin of the resin-soaked hybrid fiber is cured to form a fiber reinforced polymer rebar. The cured fiber reinforced polymer rebar may be advanced along a pull mechanism.

The final step of the process may include cutting the cured fiber reinforced polymer rebar into appropriate lengths.

Definitions

As used herein "ductility" is the capacity of a material to deform and provide residual mechanical resistance beyond the yielding of the material. Rebar ductility is an asset for the safety of civil structures as it delays structure collapse and provides indications about the imminence of structure collapse.

As used herein "ultra-high-molecular weight polyethylene (UHMWPE)" is a subset of thermoplastic polyethylene. It has extremely long chains, with a molecular average weight usually between 3 and 9 million Da. The longer chain serves to transfer load more effectively to the polymer backbone by strengthening intermolecular interactions.

High-Ductility-FRP Rebar Composition

As noted above, the HD-FRP rebar includes a polymer and at least two fibers. The polymer in accordance with one or more embodiments may be a thermoset polymer or a thermoplastic polymer. Examples of the polymer may include but are not limited to, a polyvinyl ester, a polymethyl methacrylate, an epoxy, a polyurethane, and combinations thereof. Furthermore, these polymers may be reinforced or modified with organic or mineral fillers. An example of a suitable polymer may be Elium® (Arkema, Colombes, France). Examples of organic or mineral fillers include but are not limited to short fibers, clay particles, carbon black, elastomer inclusions, fire-retardant particles, UV stabilizers, and nanoparticles such as graphene platelets or carbon nanotubes.

In one or more embodiments, a polymer may be included in the HD-FRP rebar composition in an amount ranging between about 15% to about 45% by weight, based on the total weight of the HD-FRP rebar composition. The polymer may be included in the HD-FRP rebar composition in an amount having a lower limit of any of 15 wt. %, 16 wt. %, 17 wt. %, 18%, 19 wt. %, 20 wt. %, 21 wt. %, 22 wt. %, 23 wt. %, 24 wt. %, 25 wt. % and 26 wt. %, to an upper limit of any of 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. % and 45 wt. %, based on the total weight of the HD-FRP rebar composition, where any lower limit can be used in combination with any upper limit.

In one or more embodiments, the polymer may be a vinyl ester-based polymer having a Young's modulus ranging from between about 1500 MPa to about 4000 MPa when tested according to ISO 527. The Young's modulus of the vinyl ester-based polymer may have a lower limit of any of 1500 MPa, 1600 MPa, 1700 MPa, 1800 MPa, 1900 MPa, 2000 MPa, 2100 MPa, 2200 MPa, 2300 MPa, 2400 MPa, 2500 MPa, 2600 MPa, 2700 MPa, 2800 MPa, and 2900 MPa, and an upper limit of any of 3000 MPa, 3100 MPa, 3200 MPa, 3300 MPa, and 3400 MPa, 3500 MPa, 3600 MPa, 3700 MPa, 3800 MPa, 3900 MPa, or 4000 MPa where any lower limit may be paired to any mathematically compatible upper limit.

In one or more embodiments, the polymer may be a vinyl ester-based polymer with a strain at failure ranging from between about 2% to about 15% when tested according to ISO 527. The strain at failure of the vinyl ester-based polymer may have a lower limit of any of 2.0%, 2.5%, 3.0%, 3.5%, 4.0%, 4.5%, 5.0%, 5.5%, 6.0%, 6.5%, and 7.0% and an upper limit of any of 7.5%, 8.0%, 8.5%, 9.0%, 9.5%, 10%, 10.5%, 11.0%, 11.5%, 12.0%, 12.5%, 13.0%, 13.5%, 14.0%, 14.5% and 15.0% where any lower limit may be paired to any mathematically compatible upper limit.

In one or more embodiments, the polymer may be a vinyl ester-based polymer with a stress at failure ranging from between about 50 MPa to about 100 MPa when tested according to ASTM D638. The stress at failure of the vinyl ester-based polymer may have a lower limit of any of 50 MPa, 55 MPa, 60 MPa, 65 MPa, and 70 MPa and an upper limit of any of 75 MPa, 80 MPa, 85 MPa, 90 MPa, 95 MPa, and 100 MPa where any lower limit may be paired to any mathematically compatible upper limit.

In one or more embodiments, the polymer may be a vinyl ester-based polymer with a density ranging from between about 1,000 kg/m$^3$ to about 1,200 kg/m$^3$ when measured according to ASTM D1505-18. The density may be in an amount having a lower limit of any of 1,020 kg/m$^3$, 1,040 kg/m$^3$, 1,060 kg/m$^3$, 1,080 kg/m$^3$, and 1,100 kg/m$^3$ to an upper limit of any of 1,110 kg/m$^3$, 1,120 kg/m$^3$, 1,140 kg/m$^3$, 1,160 kg/m$^3$, 1,180 kg/m$^3$, and 1,200 kg/m$^3$ where any lower limit may be paired to any mathematically compatible upper limit.

In one or more embodiments, the polymer may be a vinyl ester-based polymer with a glass transition temperature (Tg) ranging from between about 100° C. to about 120° C. when measured according to ASTM E1356. The glass transition temperature (Tg) may be in an amount having a lower limit of any of 100° C., 101° C., 102° C., 103° C., 104° C., 105° C., 106° C., 107° C., 108° C., 109° C., and 110° C. to an upper limit of any of 110° C., 111° C., 112° C., 113° C., 114° C., 115° C., 116° C., 117° C., 118° C., 119° C., and 120° C. where any lower limit may be paired to any mathematically compatible upper limit.

In one or more embodiments, the polymer may be Elium® (Arkema, Colombes, France) and may have a glass transition temperature (Tg) ranging from between about 100° C. to about 110° C. when measured according to ASTM E1356.

In one or more embodiments, the polymer may be a polymethylmethacrylate-based polymer having a Young's modulus ranging from between about 2000 MPa to about 4000 MPa when tested according to ISO 527. The Young's modulus of the polymethylmethacrylate-based polymer may have a lower limit of any of 2000 MPa, 2100 MPa, 2200 MPa, 2300 MPa, 2400 MPa, 2500 MPa, 2600 MPa, 2700 MPa, 2800 MPa, and 2900 MPa, and an upper limit of any of 3000 MPa, 3100 MPa, 3200 MPa, 3300 MPa, 3400 MPa, 3500 MPa, 3600 MPa, 3700 MPa, 3800 MPa, 3900 MPa, and 4000 MPa where any lower limit may be paired to any mathematically compatible upper limit.

In one or more embodiments, the polymer may be a polymethylmethacrylate-based polymer with a strain at failure ranging from between about 2% to about 10% when tested according to ISO 527. The strain at failure of the polymethylmethacrylate -based polymer may have a lower limit of any of 2.0%, 2.5%, 3.0%, 3.5%, 4.0%, 4.5%, 5.0%, 5.5%, 6.0%, 6.5%, and 7.0% and an upper limit of any of 7.5%, 8.0%, 8.5%, 9.0%, 9.5%, and 10% where any lower limit may be paired to any mathematically compatible upper limit.

In one or more embodiments, the polymer may be a polymethylmethacrylate -based polymer with a stress at failure ranging from between about 60 MPa to about 90 MPa when tested according to ASTM D638. The stress at failure of the polymethylmethacrylate-based polymer may have a lower limit of any of 60 MPa, 65 MPa, and 70 MPa and an upper limit of any of 75 MPa, 80 MPa, 85 MPa, and 90 MPa where any lower limit may be paired to any mathematically compatible upper limit.

In one or more embodiments, the polymer may be a polymethylmethacrylate-based polymer with a density ranging from between about 1,100 kg/m$^3$ to about 1,300 kg/m$^3$ when measured according to ASTM D1505-18. The density of the polymethylmethacrylate-based polymer may be in an amount having a lower limit of any of 1,100 kg/m$^3$, 1,110 kg/m$^3$, 1,120 kg/m$^3$, 1,130 kg/m$^3$, 1,140 kg/m$^3$, 1,150 kg/m$^3$, 1,160 kg/m$^3$, 1,170 kg/m$^3$, 1,180 kg/m$^3$, 1,190 kg/m$^3$, and 1,200 kg/m$^3$ to an upper limit of any of 1,210 kg/m$^3$, 1,220 kg/m$^3$, 1,230 kg/m$^3$, 1,240 kg/m$^3$, 1,250 kg/m$^3$, 1,260 kg/m$^3$, 1,270 kg/m$^3$, 1,280 kg/m$^3$, 1,290 kg/m$^3$, and 1,300 kg/m$^3$ where any lower limit may be paired to any mathematically compatible upper limit.

In one or more embodiments, the polymer may be an epoxy-based polymer having a Young's modulus ranging from between about 2300 MPa to about 4000 MPa when tested according to ISO 527. The Young's modulus of the an epoxy-based polymer may have a lower limit of any of 2300 MPa, 2400 MPa, 2500 MPa, 2600 MPa, 2700 MPa, 2800 MPa, and 2900 MPa, and an upper limit of any of 3000 MPa, 3100 MPa, 3200 MPa, 3300 MPa, 3400 MPa, 3500 MPa, 3600 MPa, 3700 MPa, 3800 MPa, 3900 MPa, and 4000 MPa where any lower limit may be paired to any mathematically compatible upper limit.

In one or more embodiments, the polymer may be an epoxy-based polymer with a strain at failure ranging from between about 1% to about 7% when tested according to ISO 527. The strain at failure of the epoxy-based polymer may have a lower limit of any of 1.0%, 1.5%, 2.0%, 2.5%, 3.0%, 3.5%, and 4.0%, and an upper limit of any of 4.5%, 5.0%, 5.5%, 6.0%, 6.5%, and 7.0% where any lower limit may be paired to any mathematically compatible upper limit.

In one or more embodiments, the polymer may be an epoxy-based polymer with a stress at failure ranging from between about 40 MPa to about 100 MPa when tested according to ASTM D638. The stress at failure of the epoxy-based polymer may have a lower limit of any of 40 MPa, 45 MPa, 50 MPa, 55 MPa, 60 MPa, 65 MPa, and 70 MPa and an upper limit of any of 75 MPa, 80 MPa, 85 MPa, 90 MPa, 95 MPa and 100 MPa where any lower limit may be paired to any mathematically compatible upper limit.

In one or more embodiments, the polymer may be an epoxy-based polymer with a density ranging from between about 1,100 kg/m$^3$ to about 1,500 kg/m$^3$ when measured according to ASTM D1505-18. The density of the epoxy-based polymer may be in an amount having a lower limit of any of 1,100 kg/m$^3$, 1,110 kg/m$^3$, 1,120 kg/m$^3$, 1,130 kg/m$^3$, 1,140 kg/m$^3$, 1,150 kg/m$^3$, 1,160 kg/m$^3$, 1,170 kg/m$^3$, 1,180 kg/m$^3$, 1,190 kg/m$^3$, 1,200 kg/m$^3$ 1,210 kg/m$^3$, 1,220 kg/m$^3$, 1,230 kg/m$^3$, 1,240 kg/m$^3$, 1,250 kg/m$^3$, 1,260 kg/m$^3$, 1,270 kg/m$^3$, 1,280 kg/m$^3$, 1,290 kg/m$^3$, and 1,300 kg/m$^3$, to an upper limit of any of 1,310 kg/m$^3$, 1,320 kg/m$^3$, 1,330 kg/m$^3$, 1,340 kg/m$^3$, 1,350 kg/m$^3$, 1,360 kg/m$^3$, 1,370 kg/m$^3$, 1,380 kg/m$^3$, 1,390 kg/m$^3$, 1,400 kg/m$^3$ 1,410 kg/m$^3$, 1,420 kg/m$^3$, 1,430 kg/m$^3$, 1,440 kg/m$^3$, 1,450 kg/m$^3$, 1,460 kg/m$^3$, 1,470 kg/m$^3$, 1,480 kg/m$^3$, 1,490 kg/m$^3$, and 1,500 kg/m$^3$ where any lower limit may be paired to any mathematically compatible upper limit.

In one or more embodiments, the polymer may be a polyurethane-based polymer having a Young's modulus ranging from between about 900 MPa to about 2000 MPa when tested according to ISO 527. The Young's modulus of the polyurethane-based polymer may have a lower limit of any of 900 MPa, 910 MPa, 920 MPa, 930 MPa, 940 MPa, 950 MPa, 960 MPa, 970 MPa, 980 MPa, 900 MPa, and 1000 MPa, and an upper limit of any of 1100 MPa, 1200 MPa, 1300 MPa, 1400 MPa, 1500 MPa, 1600 MPa, 1700 MPa, 1800 MPa, 1900 MPa, and 2000 MPa where any lower limit may be paired to any In one or more embodiments, the polymer may be a polyurethane-based polymer with a strain at failure ranging from between about 2% to about 50% when tested according to ISO 527. The strain at failure of the polyurethane-based polymer may have a lower limit of any of 2.0%, 2.5%, 3.0%, 3.5%, 4.0%, 4.5%, 5.0%, 5.5%, 6.0%, 6.5%, 7.0% 7.5%, 8.0%, 8.5%, 9.0%, 9.5%, 10.0%, 10.5%, 11.0%, 11.5%, 12.0%, 12.5%, 13.0%, 13.5%, 14.0%, 14.5%,15.0%, 15.5%, 16.0%, 16.5%, 17.0%, 17.5%,18.0%, 18.5%, 19.0%, 19.5%, 20.0%, 20.5%, 21.0%, 21.5%, 22.0%, 22.5%, 23.0%, 23.5%, 24.0%, 24.5%, and 25.0%, and an upper limit of any of 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0%, 40.5%, 41.0%, 41.5%, 42.0%, 42.5%, 43.0%, 43.5%, 44.0%, 44.5%, 45.0%, 45.5%, 46.0%, 46.5%, 47.0%, 47.5%, 48.0%, 48.5%, 49.0%, 49.5%, and 50.0% where any lower limit may be paired to any mathematically compatible upper limit.

In one or more embodiments, the polymer may be a polyurethane-based polymer with a stress at failure ranging from between about 5 MPa to about 25 MPa when tested according to ASTM D638. The stress at failure of the polyurethane-based polymer may have a lower limit of any of 5 MPa, 10 MPa, and 15 MPa and an upper limit of any of 20 and 25 MPa where any lower limit may be paired to any mathematically compatible upper limit.

In one or more embodiments, the polymer may be a polyurethane-based polymer with a density ranging from between about 1,100 kg/m$^3$ to about 1,300 kg/m$^3$ when measured according to ASTM D1505-18. The density of the polyurethane -based polymer may be in an amount having a lower limit of any of 1,100 kg/m$^3$, 1,110 kg/m$^3$, 1,120 kg/m$^3$, 1,130 kg/m$^3$, 1,140 kg/m$^3$, 1,150 kg/m$^3$, 1,160 kg/m$^3$, 1,170 kg/m$^3$, 1,180 kg/m$^3$, 1,190 kg/m$^3$, and 1,200 kg/m$^3$ to an upper limit of any of 1,210 kg/m$^3$, 1,220 kg/m$^3$, 1,230 kg/m$^3$, 1,240 kg/m$^3$, 1,250 kg/m$^3$, 1,260 kg/m$^3$, 1,270 kg/m$^3$, 1,280 kg/m$^3$, 1,290 kg/m$^3$, and 1,300 kg/m$^3$ where any lower limit may be paired to any mathematically compatible upper limit.

The HD-FRP rebar composition in accordance with one or more embodiments of the present disclosure may include a first fiber and a second fiber. In one or more embodiments, the first fiber may be an ultra-high molecular weight polyethylene. In one or more embodiments, the second fiber may be carbon fiber, a glass fiber, or combinations thereof.

In one or more embodiments, the first fiber may be included in the HD-FRP rebar composition in an amount ranging between about 30% to about 55% by weight, based on the total weight of the HD-FRP rebar composition. The first fiber may be included in the HD-FRP rebar composition in an amount having a lower limit of any of 30 wt. %, 31 wt. %, 32 wt. %, 33%, 34 wt. %, 35 wt. %, 36 wt. %, 37 wt. %, 38 wt. %, 39 wt. % or 40 wt. %, to an upper limit of any of 41 wt. %, 42 wt. %, 43 wt. %, 44 wt. %, 45 wt. %, 46 wt. %, 47 wt. %, 48 wt. %, 49 wt. %, 50 wt. %, 51 wt. %, 52 wt. %, 53 wt. %, 54 wt. % or 55 wt. %, based on the total weight of the HD-FRP rebar composition, where any lower limit can be used in combination with any upper limit.

In one or more embodiments, the first fiber may be a UHMWPE with a Young's modulus ranging from between about 110,000 MPa to about 140,000 MPa when tested according to ASTM D3822-14. The Young's modulus may be in an amount having a lower limit of any of 110,000 MPa, 111,000 MPa, 112,000 MPa, 113,000 MPa, 114,000 MPa, 115,000 MPa, 116,000 MPa, 117,000 MPa, 118,000 MPa, 119,000 MPa, 120,000 MPa, 121,000 MPa, 122,000 MPa, 123,000 MPa, 124,000 MPa, and 125,000 MPa, to an upper limit of any of 126,000 MPa, 127,000 MPa, 128,000 MPa, 129,000 MPa, 130,000 MPa, 131,000 MPa, 132,000 MPa, 133,000 MPa, 134,000 MPa 135,000 MPa, 136,000 MPa, 137,000 MPa, 138,000 MPa, 139,000 MPa, and 140,000 MPa where any lower limit may be paired to any mathematically compatible upper limit.

In one or more embodiments, the first fiber may be a UHMWPE with a strain at failure ranging from between about 3.0% to about 4.0% when tested according to ASTM D3822-14. The strain at failure may be in an amount having a lower limit of any of 3.0%, 3.1%, 3.2%, 3.3%, 3.4%, and 3.5% to an upper limit of any of 3.6%, 3.7%, 3.8%, 3.9%, and 4.0% where any lower limit may be paired to any mathematically compatible upper limit.

In one or more embodiments, the first fiber may be a UHMWPE with a stress at failure ranging from between about 2.0 GPa to about 5.0 GPa when tested according to ASTM D3822-14. The stress at failure may be in an amount having a lower limit of any of 4.0 GPa, 4.1 GPa, 4.2 GPa, 4.3 GPa, 4.4 GPa, and 4.5 GPa to an upper limit of any of 4.6 GPa, 4.7 GPa, 4.8 GPa, 4.9 GPa, and 5.0 GPa where any lower limit may be paired to any mathematically compatible upper limit.

In one or more embodiments, the first fiber may be a UHMWPE with a density ranging from between about 800 $kg/m^3$ to about 900 $kg/m^3$ when tested according to ASTM D3800-16. The density may be in an amount having a lower limit of any of 800 $kg/m^3$, 810 $kg/m^3$, 820 $kg/m^3$, 830 $kg/m^3$, or 840 $kg/m^3$ to an upper limit of any of 850 $kg/m^3$, 860 $kg/m^3$, 870 $kg/m^3$, 880 $kg/m^3$, 890 $kg/m^3$, or 900 $kg/m^3$ where any lower limit may be paired to any mathematically compatible upper limit.

In one or more embodiments, the first fiber may be a UHMWPE with a diameter ranging from between about 6 micrometer ($\mu$m) to about 50 micrometer ($\mu$m). The diameter may be in an amount having a lower limit of any of 6 $\mu$m, 7 $\mu$m, 8 $\mu$m, 9 $\mu$m, 10 $\mu$m, 11 $\mu$m, 12 $\mu$m, 13 $\mu$m, 14 $\mu$m, 15 $\mu$m, 16 $\mu$m, 17 $\mu$m, 18 $\mu$m, 19 $\mu$m, 20 $\mu$m, 21 $\mu$m, 22 $\mu$m, 23 $\mu$m, 24 $\mu$m, 25 $\mu$m, 26 $\mu$m, 27 $\mu$m, 28 $\mu$m, 29 $\mu$m, 30 $\mu$m, 31 $\mu$m, 32 $\mu$m, 33 $\mu$m, and 34 $\mu$m, to an upper limit of any of 35 $\mu$m, 36 $\mu$m, 37 $\mu$m, 38 $\mu$m, 39 $\mu$m, 40 $\mu$m, 41 $\mu$m, 42 $\mu$m, 43 $\mu$m, 44 $\mu$m, 45 $\mu$m, 46 $\mu$m, 47 $\mu$m, 48 $\mu$m, 49 $\mu$m, and 50 $\mu$m, where any lower limit may be paired to any mathematically compatible upper limit.

In one or more embodiments, the first fiber may be a UHMWPE with a weight average molecular weight ranging from between about 3 million Da to about 9 million Da. The weight average molecular weight may be in an amount having a lower limit of any of 3 million, 3.5 million, 4 million, 4.5 million and 5 million Da, to an upper limit of any of 5.5 million, 6 million, 6.5 million, 7 million, 7.5 million, 8 million, 8.5 million, and 9 million Da, where any lower limit may be paired to any mathematically compatible upper limit.

In one or more embodiments, the second fiber may be included in the HD-FRP rebar composition in an amount ranging between about 14% to about 35% by weight, based on the total weight of the HD-FRP rebar composition. The second fiber may be included in the HD-FRP rebar composition in an amount having a lower limit of any of 14 wt. %, 15 wt. %, 16 wt. %, 17%, 18 wt. %, 19 wt. %, 20 wt. %, 21 wt. %, 22 wt. %, 23 wt. % or 24 wt. %, to an upper limit of any of 25 wt. %, 26 wt. %, 27 wt. %, 28 wt. %, 29 wt. %, 30 wt. %, 31 wt. %, 32 wt. %, 33 wt. %, 34 wt. %, or 35 wt. %, based on the total weight of the HD-FRP rebar composition, where any lower limit can be used in combination with any upper limit.

In one or more embodiments, the second fiber may be a carbon fiber with a Young's modulus ranging from between about 150,000 MPa to about 900,000 MPa when tested according to ASTM D3822M-14. The Young's modulus may be in an amount having a lower limit of any of 150,000 MPa, 200,000 MPa, 250,000 MPa, 300,000 MPa, 350,000 MPa, 400,000, and 450,000 MPa to an upper limit of any of 500,000 MPa, 550,000 MPa, 600,000 MPa, 650,000 MPa, 700,000 MPa, 750,000 MPa, 800,000 MPa, 850,000 MPa, and 900,000 MPa, where any lower limit may be paired to any mathematically compatible upper limit.

In one or more embodiments, the second fiber may be a carbon fiber with a strain at failure ranging from between about 0.3% to about 2.0% when tested according to ASTM D3822M-14. The strain at failure may be in an amount having a lower limit of any of 0.3%, 0.4%, 0.5%, 0.6%, 0.7%, 0.8%, 0.9%, 1.0%, 1.1%, 1.2%, 1.3%, 1.4%, and 1.5% to an upper limit of any of 1.6%, 1.7%, 1.8%, 1.9%, and 2.0% where any lower limit may be paired to any mathematically compatible upper limit.

In one or more embodiments, the second fiber may be a carbon fiber with a stress at failure ranging from between about 1.0 GPa to about 7.0 GPa when tested according to ASTM D3822M-14 . . . The stress at failure may be in an amount having a lower limit of any of 1.0 GPa, 1.1 GPa, 1.2 GPa, 1.3 GPa, 1.4 GPa, 1.5 GPa, 1.6 GPa, 1.7 GPa, 1.8 GPa, 1.9 GPa, 2.0 GPa, 2.1 GPa, 2.2 GPa, 2.3 GPa, 2.4 GPa, 2.5 GPa, 2.6 GPa, 2.7 GPa, 2.8 GPa, 2.9 GPa , 3.0 GPa, 3.1 GPa, 3.2 GPa, 3.3 GPa, 3.4 GPa, or 3.5 GPa, 3.6 GPa, 3.7 GPa, 3.8 GPa, 3.9 GPa, 4.0 GPa, 4.1 GPa, 4.2 GPa, 4.3 GPa, 4.4 GPa, and 4.5 GPa to an upper limit of any of 4.6 GPa, 4.7 GPa, 4.8 GPa, 4.9 GPa, 5.0 GPa, 5.1 GPa, 5.2 GPa, 5.3 GPa, 5.4 GPa, 5.5 GPa, 5.6 GPa, 5.7 GPa, 5.8 GPa, 5.9 GPa, 6.0 GPa, 6.1 GPa, 6.2 GPa, 6.3 GPa, 6.4 GPa, 6.5 GPa, 6.6 GPa, 6.7 GPa, 6.8 GPa, 6.9 GPa , and 7.0 GPa, where any lower limit may be paired to any mathematically compatible upper limit.

In one or more embodiments, the second fiber may be a carbon fiber with a density ranging from between about 1,700 $kg/m^3$ to about 2,200 $kg/m^3$ when tested according to ASTM D3800-16 . . . The density may be in an amount having a lower limit of any of 1,710 $kg/m^3$, 1,720 $kg/m^3$, 1,730 $kg/m^3$, 1,740 $kg/m^3$, and 1,750 $kg/m^3$ to an upper limit of any of 1,760 $kg/m^3$, 1,770 $kg/m^3$, 1,780 $kg/m^3$, 1,790 $kg/m^3$, 1,800 $kg/m^3$, 1,910 $kg/m^3$, 1,920 $kg/m^3$, 1,930 $kg/m^3$, 1,940 $kg/m^3$, 1,950 $kg/m^3$, 1,960 $kg/m^3$, 1,970 $kg/m^3$, 1,980 $kg/m^3$, 1,990 $kg/m^3$, 2,000 $kg/m^3$, 2,100 $kg/m^3$, and 2,000 $kg/m^3$ where any lower limit may be paired to any mathematically compatible upper limit.

In one or more embodiments, the second fiber may be a carbon fiber with a diameter ranging from between about 6 $\mu$m to about 20 $\mu$m. The diameter may be in an amount having a lower limit of any of 6 $\mu$m, 7 $\mu$m, 8 $\mu$m, 9 $\mu$m, 10 $\mu$m, 11 $\mu$m and 12 $\mu$m, to an upper limit of any of 13 $\mu$m, 14 $\mu$m, 15 $\mu$m, 16 $\mu$m, 17 $\mu$m, 18 $\mu$m, 19 $\mu$m, and 20 $\mu$m, where any lower limit may be paired to any mathematically compatible upper limit.

In one or more embodiments, the second fiber may be a glass fiber with a Young's modulus ranging from between about 50,000 MPa to about 90,000 MPa when tested according to ASTM D3822M-14. The Young's modulus may be in an amount having a lower limit of any of 50,000 MPa, 51,000 MPa, 52,000 MPa, 53,000 MPa, 54,000 MPa, 55,000 MPa, 56,000 MPa, 57,000 MPa, 58,000 MPa, 59,000 MPa, 60,000 MPa, 61, 000 MPa, 62,000 MPa, 63,000 MPa, 64,000 MPa and 65,000 MPa to an upper limit of any of 66,000 MPa, 67,000 MPa, 68,000 MPa, 69,000 MPa, 70,000 MPa, 71,000 MPa, 72,000 MPa, 73,000 MPa, 74,000 MPa, 75,000 MPa, 76,000 MPa, 77,000 MPa, 78,000 MPa, 79,000 MPa, 80,000 MPa, 81, 000 MPa, 82,000 MPa, 83,000 MPa, 84,000 MPa, 85,000 MPa, 86,000 MPa, 87,000 MPa, 88,000 MPa, 89,000 MPa and 90,000 MPa, where any lower limit may be paired to any mathematically compatible upper limit.

In one or more embodiments, the second fiber may be a glass fiber with a strength at failure ranging from between about 1.0 GPa to about 4.0 GPa when tested according to ASTM D3822M-14. The strength at failure may be in an amount having a lower limit of any of 1.0 GPa, 1.1 GPa, 1.4 GPa, 1.3 GPa, 1.4 GPa, 1.5 GPa, 1.6 GPa, 1.7 GPa, 1.8 GPa, 1.9 GPa, and 2.0 GPa, to an upper limit of any of 2.1 GPa, 2.2 GPa, 2.3 GPa, 2.4 GPa, 2.5 GPa, 2.6 GPa, 2.7 GPa, 2.8 GPa, 2.9 GPa , 3.0 GPa, 3.1 GPa, 3.2 GPa, 3.3 GPa, 3.4 GPa, or 3.5 GPa, 3.6 GPa, 3.7 GPa, 3.8 GPa, 3.9 GPa, and 4.0 GPa, where any lower limit may be paired to any mathematically compatible upper limit.

In one or more embodiments, the second fiber may be a glass fiber with a density ranging from between about 2,000 $kg/m^3$ to about 3,000 $kg/m^3$ when tested according to ASTM D3800-16. The density may be in an amount having a lower limit of any of 2,000 $kg/m^3$, 2,050 $kg/m^3$, 2,100 $kg/m^3$, 2,150 $kg/m^3$, 2,200 $kg/m^3$, 2,250 $kg/m^3$, 2,300 $kg/m^3$, 2,350 $kg/m^3$, and 2,400 $kg/m^3$ to an upper limit of any of 2,450 $kg/m^3$, 2,500 $kg/m^3$, 2,550 $kg/m^3$, 2,600 $kg/m^3$, 2,650 $kg/m^3$, 2,700 $kg/m^3$, 2,750 $kg/m^3$, 2,800 $kg/m^3$, 2,850 $kg/m^3$, 2,900 $kg/m^3$, 2,950 $kg/m^3$, and 3,000 $kg/m^3$ where any lower limit may be paired to any mathematically compatible upper limit.

In one or more embodiments, the second fiber may be a glass fiber with a diameter ranging from between about 5 μm to about 25 μm. The diameter may be in an amount having a lower limit of any of 5 μm, 6 μm, 7 μm, 8 μm, 9 μm, 10 μm, 11 μm, and 12 μm, to an upper limit of any of 13 μm, 14 μm, 15 μm, 16 μm, 17 82 m, 18 μm, 19 μm, 20 μm, 21 μm, 22 μm, 23 μm, 24 μm and 25 μm, where any lower limit may be paired to any mathematically compatible upper limit.

In one or more embodiments, the second fiber may be a high-performance polyester fiber with a Young's modulus ranging from between about 10,000 MPa to about 20,000 MPa when tested according to ASTM D3822M-14. The Young's modulus may be in an amount having a lower limit of any of 10,000 MPa, 11,000 MPa, 12,000 MPa, 13,000 MPa, 14,000 MPa, and 15,000 MPa to an upper limit of any of 16,000 MPa, 17,000 MPa, 18,000 MPa, 19,000 MPa, and 20,000 MPa, where any lower limit may be paired to any In one or more embodiments, the second fiber may be a high-performance polyester fiber with a strength at failure ranging from between about 500 MPa to about 800 MPa when tested according to ASTM D3822M-14. The strength at failure may be in an amount having a lower limit of any of 500 MPa, 510 MPa, 510 MPa, 520 MPa, 530 MPa, 540 MPa, 550 MPa, 560 MPa, 570 MPa, 580 MPa, and 600 MPa, to an upper limit of any of 700 MPa, 710 MPa, 720 MPa, 730 MPa, 740 MPa, 750 MPa, 760 MPa, 770 MPa, 780 MPa , 790 MPa, and 800 MPa, where any lower limit may be paired to any mathematically compatible upper limit.

In one or more embodiments, the second fiber may be a high-performance polyester fiber with a density ranging from between about 1,000 $kg/m^3$ to about 1,500 $kg/m^3$ when tested according to ASTM D3800-16. The density may be in an amount having a lower limit of any of 1,000 $kg/m^3$, 1,050 $kg/m^3$, 1,100 $kg/m^3$, 1,150 $kg/m^3$, 1,200 $kg/m^3$, and 1,250 $kg/m^3$, to an upper limit of any of 1,300 $kg/m^3$, 1,350 $kg/m^3$, 1,400 $kg/m^3$, 1,450 $kg/m^3$, and 1,500 $kg/m^3$ where any lower limit may be paired to any mathematically compatible upper limit.

In one or more embodiments, the second fiber may be a high-performance polyester fiber with a diameter ranging from between about 3 μm to about 15 μm. The diameter may be in an amount having a lower limit of any of 3 μm, 4 μm, 5 μm, 6 μm, 7 μm, 8 μm, 9 μm, and 10 μm, to an upper limit of any of 11 μm, 12 μm, 13 μm, 14 μm, and 15 μm, where any lower limit may be paired to any mathematically compatible upper limit.

In one or more embodiments, the second fiber may be a polypropylene fiber with a Young's modulus ranging from between about 1,000 MPa to about 10,000 MPa when tested according to ASTM D3822M-14. The Young's modulus may be in an amount having a lower limit of any of 1,000 MPa, 2,000 MPa, 3,000 MPa, 4,000 MPa, and 5,000 MPa, to an upper limit of any of 6,000 MPa, 7,000 MPa, 8,000 MPa, 9,000 MPa, and 10,000 MPa, where any lower limit may be paired to any mathematically compatible upper limit.

In one or more embodiments, the second fiber may be a polypropylene fiber with a strength at failure ranging from between about 500 MPa to about 800 MPa when tested according to ASTM D3822M-14. The strength at failure may be in an amount having a lower limit of any of 500 MPa, 510 MPa, 510 MPa, 520 MPa, 530 MPa, 540 MPa, 550 MPa, 560 MPa, 570 MPa, 580 MPa, and 600 MPa, to an upper limit of any of 700 MPa, 710 MPa, 720 MPa, 730 MPa, 740 MPa, 750 MPa, 760 MPa, 770 MPa, 780 MPa , 790 MPa, and 800 MPa, where any lower limit may be paired to any mathematically compatible upper limit.

In one or more embodiments, the second fiber may be a polypropylene fiber with a density ranging from between about 800 $kg/m^3$ to about 1,000 $kg/m^3$ when tested according to ASTM D3800-16. The density may be in an amount having a lower limit of any of 800 $kg/m^3$, 810 $kg/m^3$, 820 $kg/m^3$, 830 $kg/m^3$, 840 $kg/m^3$, 850 $kg/m^3$, 860 $kg/m^3$, 870 $kg/m^3$, 880 $kg/m^3$, 890 $kg/m^3$, and 900 $kg/m^3$, to an upper limit of any of 900 $kg/m^3$, 910 $kg/m^3$, 920 $kg/m^3$, 930 $kg/m^3$, 940 $kg/m^3$, 950 $kg/m^3$, 960 $kg/m^3$, 970 $kg/m^3$, 980 $kg/m^3$, 990 $kg/m^3$, and 1,000 $kg/m^3$ where any lower limit may be paired to any mathematically compatible upper limit.

In one or more embodiments, the second fiber may be a polypropylene fiber with a diameter ranging from between about 5 μm to about 25 μm. The diameter may be in an amount having a lower limit of any of 5 μm, 6 μm, 7 μm, 8 μm, 9 μm, 10 μm, 11 μm, and 12 μm, to an upper limit of any of 13 μm, 14 μm, 15 μm, 16 μm, 17 μm, 18 μm, 19 μm, 20 μm, 21 μm, 22 μm, 23 μm, 24 μm and 25 μm, where any lower limit may be paired to any mathematically compatible upper limit.

The weight ratio of the first fiber to the second fiber of the HD-FRP rebar composition of the present disclosure may be in a range of about 1:1 to 4:1, or 2:1 to 3:1.

Figure 1B:
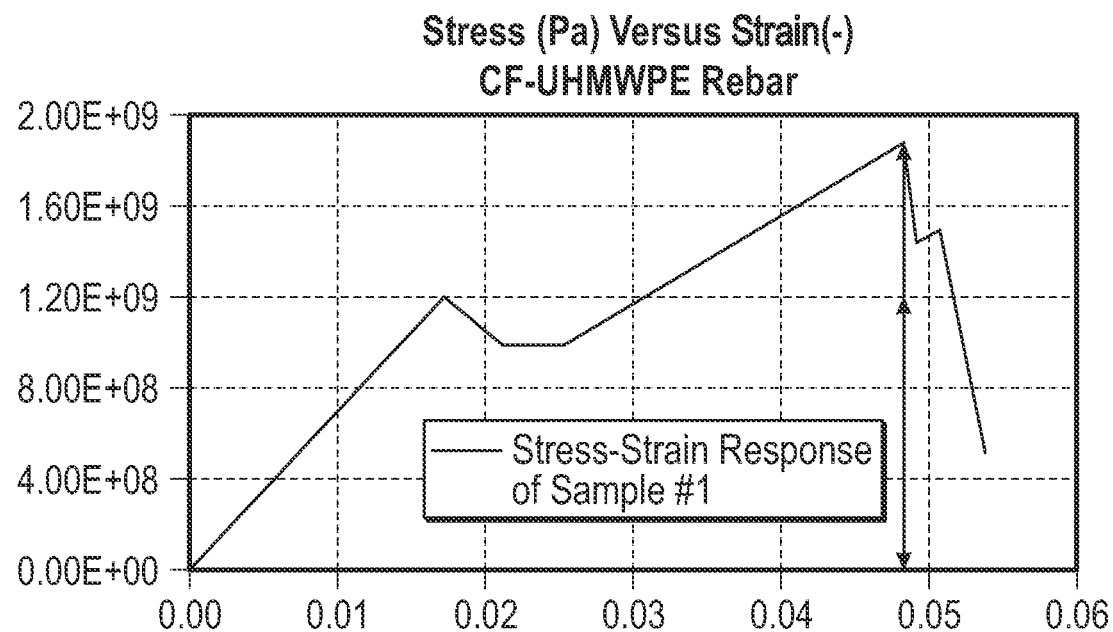
FIG. 1B is the ductile stress-strain response of the HD-FRP of FIG. 1A.

FIG. 1A depicts a microstructure representation of one embodiment of an HD-FRP composed of a polymer matrix 102, UHMWPE 100, and carbon fiber 104. FIG. 1B is a simulated plot of force versus time representing the ductile stress-strain response of the HD-FRP containing carbon fiber with visible ductility and volume participation of each phase.

Method to Fabricate High-Ductility-FRP Rebar

One or more embodiments of the present disclosure relate to a method of preparing high-ductility-FRP rebar compositions using a variant of a pultrusion process known as co-pultrusion. Pultrusion is an automated process for manufacturing fiber-reinforced composite materials into continuous, constant-cross-section profiles. In a standard pultrusion process, only one type of fiber roving is used. A key difference between the disclosed co-pultrusion method and conventional pultrusion methods is in the usage of two different types of fiber rovings simultaneously in co-pultrusion 200 as shown in FIG. 2A.

Figure 2A:
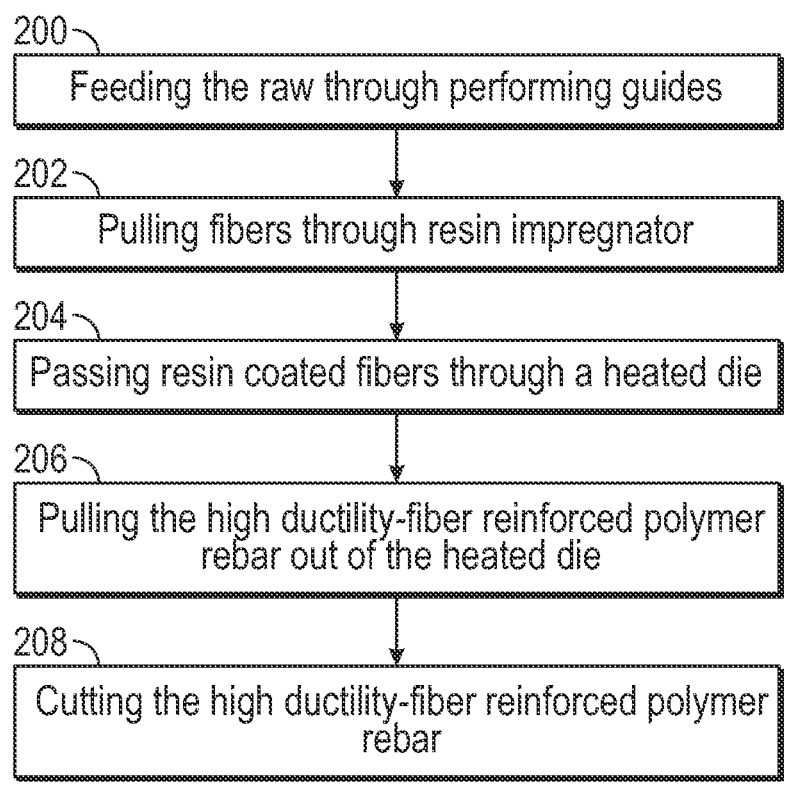
FIG. 2A shows a block flow diagram of a method according to one or more embodiments of the present disclosure.

FIG. 2A is a schematic illustration of the steps in the co-pultrusion process in accordance with one or more embodiments. The first step 200 of the process involves feeding fiber rovings through preforming guides, followed by pulling the fibers 202 through a resin impregnator to impregnate the fiber material with a resin. The next step includes passing the resin coated fibers 204 through a heated die where the shape of the resulting rebar is formed. As the resin coated fibers pass through the die, the resin coated fibers begin to solidify into their final shape as the heat of the die initiates the cross-linking process within the impregnated reinforcements forming the rebar structure. The final step of the process involves pulling 206 the rebar out of the die and cutting the rebar 208 into desired lengths of the final rebar.

Figure 2B:
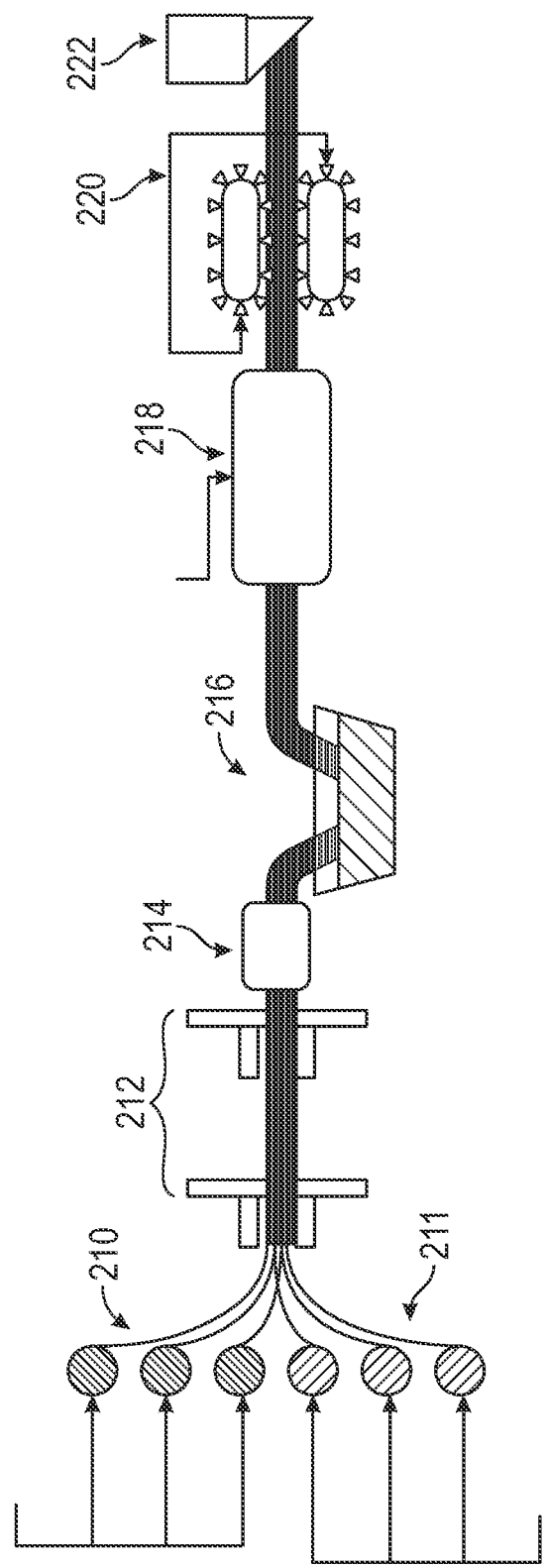
FIG. 2B is a schematic of a co-pultrusion process in accordance with one or more embodiments of the present disclosure.

FIG. 2B is a schematic illustration of the co-pultrusion apparatus and process according to embodiments of the present disclosure. As noted above, in one or more embodiments, the first step 200 in the co-pultrusion process may include feeding a first fiber 210 and a second fiber 211 through preforming guides 212, thereby forming a hybrid fiber. The compositions of the first and second fibers are as described above. The arrangement of fibers in rebar may be controlled by the preforming guide 212. The preforming guide 212 may have a series of holes through which different fibers are fed. Different fibers may be fed through different holes to achieve a desired distribution of fibers in the rebar. Thus, the configuration of holes in the preforming guide determines the arrangement of fibers in the rebar.

Each type of glass or carbon fiber in one or more embodiments may be maintained at a specific tension to ensure that when the rebar is used to reinforce concrete, there are not any residual strains resulting from shrinkage. In contrast, in one or more embodiments, no tension may be applied to polymer fibers such as UHMWPE. Tension in polymer fibers may lead to permanent thermoplastic deformations in the polymer fibers that may degrade the polymer fibers and decrease their performance. Polymer fibers have a high thermal expansion coefficient. Polymer fibers may have a high thermal expansion coefficient in the range of temperature in one or more embodiments. Because the coefficient of thermal expansion is of the same order of magnitude as the polymer matrix, pulling the polymer fiber without significant tension may minimize residual stress after cooling. Residual stresses may have detrimental effects on long-term performances of the rebar through relaxation and creep.

Thus, in one or more embodiments, the tension in the first and second fiber may be different. This may not be effectively achieved with a conventional pultrusion process. As a result, compared to the process of pultrusion, where both fibers are held under the same tension, a difference in stiffness between the two fibers may result in a difference in strain in the final rebar which may impact the final performance of the rebar.

In one or more embodiments when the first fiber 210 is a UHMWPE fiber, the UHMWPE fiber may be held at a low or no tension to avoid deforming the fibers. In one or more embodiments, the second fiber 211 may be a carbon or a glass fiber that is held at a natural tension caused by the friction of fibers through the preforming guides 212 and pullers 220.

In one or more embodiments, the two fibers may be pulled at a speed of between 0.1 to 0.3 meters/minute. As may be appreciated by those skilled it the art, the speed may be adjusted as required to avoid problems such as fibers buckling in the process. The pulling speed is a generally compromise between rebar quality and production rate.

The temperature range at which the fibers are pulled through the preforming guides 212 may be in the range of between 30° C. to about 45° C. The temperature may have a lower limit of any of 30° C., 31° C., 32° C., 33° C., 34° C., 35° C., 36° C., and 37° C., to an upper limit of any of 38° C., 39° C., 40° C., 41° C., 42° C., 43° C., 44° C., and 45° C., where any lower limit may be paired to any mathematically compatible upper limit. The temperature may be maintained using infrared heaters.

In one or more embodiments, the second step 202 in the co-pultrusion process may include pulling the fibers through a liquid polymeric resin in a resin impregnator 216 for resin impregnation to form a resin-soaked hybrid fiber. The liquid polymeric resin in the resin impregnator may act as a resin bath to soak the fibers. The resin in accordance with one or more embodiments may be composed of oligomers, monomers, initiators, promotors, fillers, and UV inhibitors. Examples of oligomers that may be in the resin bath include but are not limited to vinyl ester, and acrylic acid. Examples of monomers that may be in the resin bath include but are not limited to styrene and methyl methacrylate. Examples of suitable initiators include but are not limited to methyl ethyl ketone peroxide, and dilauroyl peroxide. An example of a suitable promoter is cobalt naphthenate. Fillers, such as clay, may also be included in the resin bath. Examples of UV inhibitors that may be in the resin bath include but are not limited to carbon black, titanium oxide ($TiO_2$), 2-hydroxybenzophenone, 2-hydroxy-benzotriazole derivatives, or hydroxyphenyltriazine.

In one or more embodiments, the two fibers may be pulled and bathed in a liquid polymeric resin under a specified speed and temperature. The speed at which the fibers may be pulled according to one or more embodiments is between 0.1 to 0.3 meter/minute. The temperature range between which the two fibers may be pulled through the resin impregnator according to one or more embodiment may be between 25° C. and 35° C. The temperature have a lower limit of any of 25° C., 26° C., 27° C., 28° C., 29° C., and 30° C., and an upper limit of any of 31° C., 32° C., 33° C., 34° C., and 35° C., where any lower limit may be paired to any mathematically compatible upper limit. As the fibers are pulled through the resin bath under the previously described conditions, the liquid polymeric resin is able to completely soak the fibers.

FIG. 2B illustrates that the hybrid fibers may optionally be passed through an atmospheric plasma treatment chamber 214 prior to being fed to the resin impregnator. The fibers may be treated with plasma for about 10 to 25 seconds. The plasma treatment time may have a lower limit of any of 10 seconds, 11 seconds, 12 seconds, 13 seconds, 14 seconds, 15 seconds, 16 seconds, and 17 seconds and an upper limit of any of 18 seconds, 19 seconds, 20 seconds, 21 seconds, 22 seconds, 23 seconds, 24 seconds, and 25 seconds, where any lower limit may be paired to any mathematically compatible upper limit. The plasma source may be achieved using helium gas in an electric field media for gas excitation. The purpose of this treatment is to create microroughness at the surface of the fibers and surface chemical changes that will allow better wetting of the resin during pultrusion and improved adhesion between the resin and the fibers. Particularly, in one or more embodiments where the fiber has a low chemical reactivity with the polymer, plasma treatment may enhance fiber-polymer matrix binding.

After resin impregnation, the polymer resin of the resin-soaked hybrid fiber in one or more embodiments may be polymerized and/or cured by passing it through a heated die 218 at a specific temperature based on if the polymer resin is a thermoset or thermoplastic, respectively. In one or more embodiments, the fibers may be pulled through the heated die at a speed of about 0.3 meter/min. The temperature of the die is adjusted to obtain a minimum of 95% curing of the polymer matrix according to ASTM D7957. Thus, the glass transition temperature of the polymer matrix is a key parameter driving the adjustment of the die temperature and resident time in the die. For each polymer matrix, preliminary tests are required to verify the level of curing such that an appropriate die temperature may be chosen to achieve the desired level of curing. If this curing temperature is higher than the melting or glass transition temperature of the fibers being used, there will be inconsistencies in the cross-section of the rebar which will harm its performance. Thus, the temperature should be appropriately selected so as to not damage the mechanical properties of the fibers.

In one or more embodiments, the shape of the opening in the heated die 218 may be circular with a diameter of about 10 mm. However, in other embodiments, different sized openings can be used to produce different diameter rebars. The length of the heated die 218 in one or more embodiments may vary, and can be up to 1 meter.

As noted above, the temperature of the heated die may be selected based upon the type of resin being cured. Generally, the temperature of the heated die 218 may be up to 150° C. The maximum temperature of the heated die 218 depends on the type of matrix and fibers used. For example, in one or more embodiments, if UHMWPE fibers are used, the temperature of the heated di 218 may not exceed 140° C. Additionally, the heated die may have sections with different temperatures to achieve a curing process that includes several different temperatures. For example, in one or more particular embodiments, the heated die 218 may be split to up to four sections each having a different temperature, where section 1 may be about 80° C., section two about 105° C., section 3 about 130° C., and section 4 about 150° C.

The polymer resin-soaked hybrid fiber undergoes cross-linking and/or radical polymerization to form a fiber reinforced polymer rebar as it is passed through the die 218. For example, in one or more embodiments, the resin impregnator 216 includes a resin bath of reactive low molecular weight vinyl ester species (oligomers) dissolved in a styrene monomer solvent. The resin bath may also contain initiator and/or promoter systems and filler systems. The initiator and/or promoter combination, activated by temperature of the die 218, may initiate the reaction between vinyl ester and styrene units. The vinyl ester and styrene units, under gradual heating temperature profile, undergo a radical polymerization reaction, which includes crosslinking resulting in the final thermoset is formed. In one or more embodiments, radical polymerization may be the predominant reaction and not crosslinking (for thermoplastic materials). However, in other embodiments, crosslinking may be the primary reaction occurring in the heated die 218 area (thermosets).

Cross-linking reactions are exothermic, therefore once initiated, the temperature of the resin exceeds that of the die. Thus, near the end of the heating process, the temperature of the resin is higher than the temperature of the die. This increase in temperature initiates the removal of the fiber reinforced polymer rebar from the heated die. To remove the rebar from the heated die 218, a pulling mechanism 206 with pullers 220 pulls the rebar out of the heated die 218. Once removed, cutters 222 cut the formed rebar into appropriate lengths.

Figure 3:
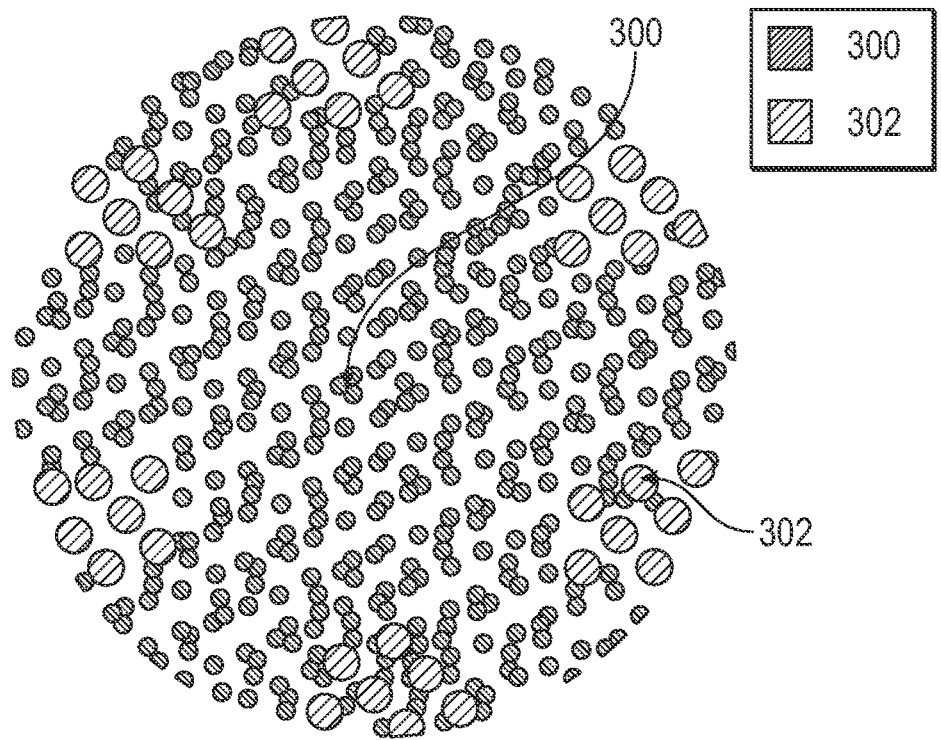
FIG. 3 is a schematic illustration of an uneven distribution of fiber types across a section of a HD-FRP rebar in one or more embodiments of the present disclosure, as achieved by co-pultrusion process.

A benefit of the above described co-pultrusion process is the ability to control the distribution of the two fibers within and across the rebar to optimize the load distribution. To maximize the ductility effect in tension and bending, the ideal distribution between the two fibers may be a roughly even distribution throughout the rebar. To maximize bending stiffness, the ideal distribution may be to have a high concentration of a stiff fiber at the outside and a high concentration of less stiff fiber at the inside. Examples of stiff fibers include but are not limited to carbon or UHMWPE. Examples of less stiff fibers may include, but are not limited to glass fiber, polyester, or polypropylene fibers. For example, as shown in FIG. 3, a rebar with stiff fibers 302 located at its periphery and less stiff fibers 300 in the center will cause a significantly stiffer response for the rebar in bending without changing stiffness and strength in the longitudinal axis. This distribution of fibers may be achieved because of the individual tensions used to pull each fiber type in the co-pultrusion process.

HD-FRP Properties

One or more embodiments of the present disclosure combines the advantage of composite rebars (strength, immunity to corrosion, and lightweight) with the ductility of steel rebars.

One or more embodiments of the HD-FRP may include improved ductile behavior as compared to conventional rebars, which are brittle, due to the combination of a stiff reinforcement with low tensile failure strain (e.g. carbon/glass fiber) with a softer reinforcement with large tensile failure strain (e.g. polymer fiber such as Ultra-High Molecular Weight Polyethylene fiber). The proportions of each of the three components also allow for high control of the ductility of the rebar.

The HD-FRP may have a ductility ratio that is greater than a reference glass fiber reinforced rebar when measured according to ASTM D7205M. The ductility ratio of the HD-FRP may be 20% greater, 22% greater, 24% greater, 26% greater, 28% greater, 30% greater, 32% greater, 34% greater, 36% greater, 38% greater, 40% greater, 42% greater, 44% greater, 46% greater, 48% greater, 50%, 52%, 54% or 55% greater than a reference glass fiber reinforced rebar.

One or more embodiments of the present disclosure may include a HD-FRP with a ductility ratio higher than the ductility ratio of a variety of commercial steel rebars except micro-alloyed steel rebar.

The HD-FRP may have an elongation at break that is greater than a reference glass fiber reinforced rebar when measured according to ASTM D7205M. The elongation at break of the HD-FRP may be 240% greater, 260% greater, 280% greater, 300% greater, 320% greater, 340% greater, 360% greater, 380% greater, 400% greater, 420% greater, 440% greater, 460% greater, 480% greater, 500% greater, 520% greater, 540% greater, or 560% greater than a reference glass fiber reinforced rebar.

EXAMPLES

The following examples are merely illustrative and should not be interpreted as limiting the scope of the present disclosure.

Materials

The bisphenol-A epoxy vinyl ester resin and PMMA were obtained from Reichhold (Durham, North Carolina, USA) and Arkema (Colombes, France) respectively. UHMWPE ($M_w$=4,000,000 g/mol) was obtained from Honeywell. Carbon fiber and Glass fiber were obtained from SGL Carbon (Wiesbaden, Germany) and Owens Corning (Toledo, Ohio, USA) respectively. High performance polyester fiber was obtained from Barnet (Arcadia, South Carolina, USA). The diethylaniline (DEA) was obtained from Aceto Corporation (Port Washington, NY, USA). MEKP-925 was obtained from United Initiators Norox (USA). Cobalt naphthenate was obtained from OMG Americas (Johnstown, Pennsylvania, USA).

Preparation of HD-FRP Rebars by Co-Pultrusion

Figure 4:
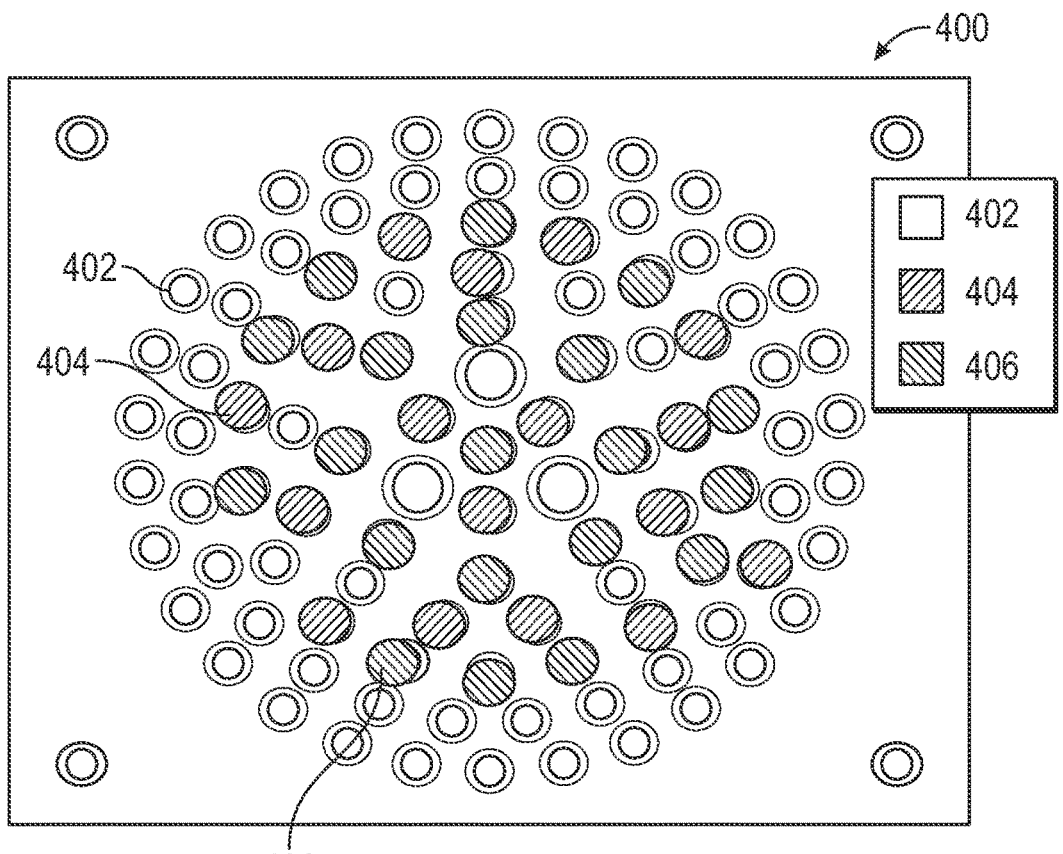
FIG. 4 is a schematic illustration of a preforming guide in one or more embodiments of the present disclosure.

A standard industry scale pultrusion line was used to manufacture the rebars. The fibers were pulled at a speed of 0.3 m/min. Fibers were arranged through fiber-guiding plates, also known as preforming guides, and impregnated with the resin in a resin bath. FIG. 4 shows a schematic illustration of a preforming guide 400 used to make the rebar composition of Sample #2 in Table 1 (below). 402 represents empty holes, 404 represents a slot for carbon fiber, and 406 represents a slot for UHMWPE. The resin bath was composed of vinyl ester liquid resin, between 1% to 1.5% of MEKP-925 (an initiator), between 0.1 to 0.4% cobalt naphthenate, and optionally less than 0.5% diethylaniline (DEA). The temperature of the resin bath was maintained between 25° C. and 35° C.].

In the resin bath the fibers were guided underneath a round bar. The tension on the fibers and the round bar spread fibers generates an open surface and therefore a good impregnation. After the impregnation the fibers were distributed and arranged in the desired way through further fiber-guiding plates and then pulled into the heated die. The temperature at the entrance of the die and exit from the die was 80° C. and 150° C., respectively, when only glass and carbon fibers were included. The temperature at the entrance of the die and exit from the die was 80° C. and 135° C., respectively, if polymer fibers were included in the rebar. The die was 1 meter long and was heated by external electric heaters. The profile was cured inside the die and subsequently gripped by alternating puller units. After being fed through the pullers the profiles were cut to the desired length.

Table 1 shows the composition of six different rebar compositions that were prepared.

TABLE 1

Composition of Rebars Made by Co-pultrusion Process.

| | | | | Vol Participation [%] | | |
| Sample # | Matrix | Fiber 1 | Fiber 2 | Matrix | Fiber 1 | Fiber 2 |
| --- | --- | --- | --- | --- | --- | --- |
| 1 | Vinyl Ester | UHMWPE | Carbon fiber | 42.8 | 39.0 | 18.2 |
| 2 | Vinyl Ester | UHMWPE | Carbon fiber | 30 | 28 | 42 |
| 3 | Vinyl Ester | UHMWPE | Glass fiber | 35 | 32.5 | 32.5 |
| 4 | Vinyl Ester | UHMWPE | Glass fiber | 30 | 32 | 38 |
| 5 | Vinyl Ester | Glass fiber | High performance polyester fiber | 30 | 39 | 31 |
| 6 | PMMA | UHMWPE | Carbon fiber | 35 | 46.8 | 18.2 |
| 7 | PMMA | UHMWPE | Carbon fiber | 35 | 50.7 | 14.3 |
| 8 | PMMA | UHMWPE | Glass fiber | 35 | 32.5 | 32.5 |

Ductility ratio and elongation at break were measured for the HD-FRP rebars in

Table 1. The ductility ratio was determined by calculating the ratio $S_{max}/S_y$ where $S_{max}$ is the maximum stress and $S_y$ is the yield stress obtained from the force-displacement curve of the rebar under quasi-static tensile test. Table 2 below shows the ductility ratio and elongation break of samples 1 and 3-5 from Table 1 and of rebars commercially available.

TABLE 2

Mechanical Properties of Rebars.

| Sample ID | Hybrid ductile rebar | Ductility ratio (-) | Elongation at break (%) | Source |
| --- | --- | --- | --- | --- |
| A | HD-FRP Sample #1 | 1.55 | 4.8 | Structural Analysis (FEM) |
| B | HD-FRP Sample #3 | 1.32 | 8.0 | Structural Analysis (FEM) |
| C | HD-FRP Sample #4 | 1.08 | 2.8 | Experimental |
| D | HD-FRP Sample #5 | 1.202 | NA (Bending) | Experimental |

TABLE 2-continued

Mechanical Properties of Rebars.

| Sample ID | Hybrid ductile rebar | Ductility ratio (-) | Elongation at break (%) | Source |
|---|---|---|---|---|
| CE-A | Hybrid rebar (Carbon Fiber/Glass Fiber) | 1.31 | 2.8 | Structural Analysis (FEM) |
| CE-B | Glass fiber reinforced rebar (Pultron) | 1.0 | 2.4 | Experimental |
| CE-C | Carbon fiber reinforced rebar | 1.0 | | Literature |
| CE-D | Micro-alloyed steel rebar | 1.41 | 27 | Literature |
| CE-E | Cold rolled steel rebar | 1.11 | 10 | Literature |
| CE-F | Cold stretched steel rebar | 1.32 | 15 | Literature |
| CE-G | QST steel rebar | 1.31 | 21 | Literature |

In Table 2, the ductility ratio and elongation at break of Samples A and B and Comparative Example CE-A was determined using mathematical modeling, and in particular by the finite element method. On the other hand, the ductility ratio and elongation at break of Samples C and D and Comparative Example CE-B were determined experimentally as explained above. The ductility ratio and elongation at break of CE-C was determined from literature reference "Mechanical properties of composite rebar under static and short-term dynamic loading", Vasilii Plevkov, Igor Baldin, Konstantin Kudyakov, et al., AIP Conference Proceedings 1800, 040018 (2017). Finally, the ductility ratio and elongation at break of Comparative Examples CE-C through CE-G were obtained from literature reference "Properties of reinforcing steels", The CARES Guide for Reinforcing Steels, Part 3, UK Cares, 2011. As shown by samples A and B in Table 2, both the inventive rebars have a ductility ratio that is higher than 1.25, as required by the American Concrete Institute 318-19 guidelines. As shown by the comparative examples from the prior art (i.e. samples CE-A through CE-G) in Table 2, the HD-FRP of sample A has the highest ductility ratio of all the rebars tested. Sample A has a ductility ratio of 1.55, which is 55% greater than the carbon fiber reinforced rebar of sample CE-C. Notably, sample B has a ductility ratio higher than that for all commercial steel rebars (samples CE-D through CE-G) except the micro-alloyed steel rebar (sample CE-C).

As shown in Table 2, samples C and D include rebars made from vinyl ester, UHMWPE, and glass fiber and vinyl ester, glass fiber, and high-performance polyester respectively, have a ductility ratio of 1.08 and 1.202 respectively. The ductility ratio of samples C and D is higher than comparative sample CE-B, a glass fiber reinforced rebar in Table 2. Notably, rebars made from vinyl ester, UHMWPE, and carbon fiber (samples A and B) have a higher ductility ratio compared to rebars made from vinyl ester, UHMWPE, and glass fiber and vinyl ester, glass fiber, and high-performance polyester.

Moving to the elongation at break, sample A has an elongation at break that is double than that of the glass fiber reinforced rebar of sample CE-B. Similarly, sample B has an elongation at break that is more than three times than that of the glass fiber reinforced rebar of sample CE-B.

Figure 5:
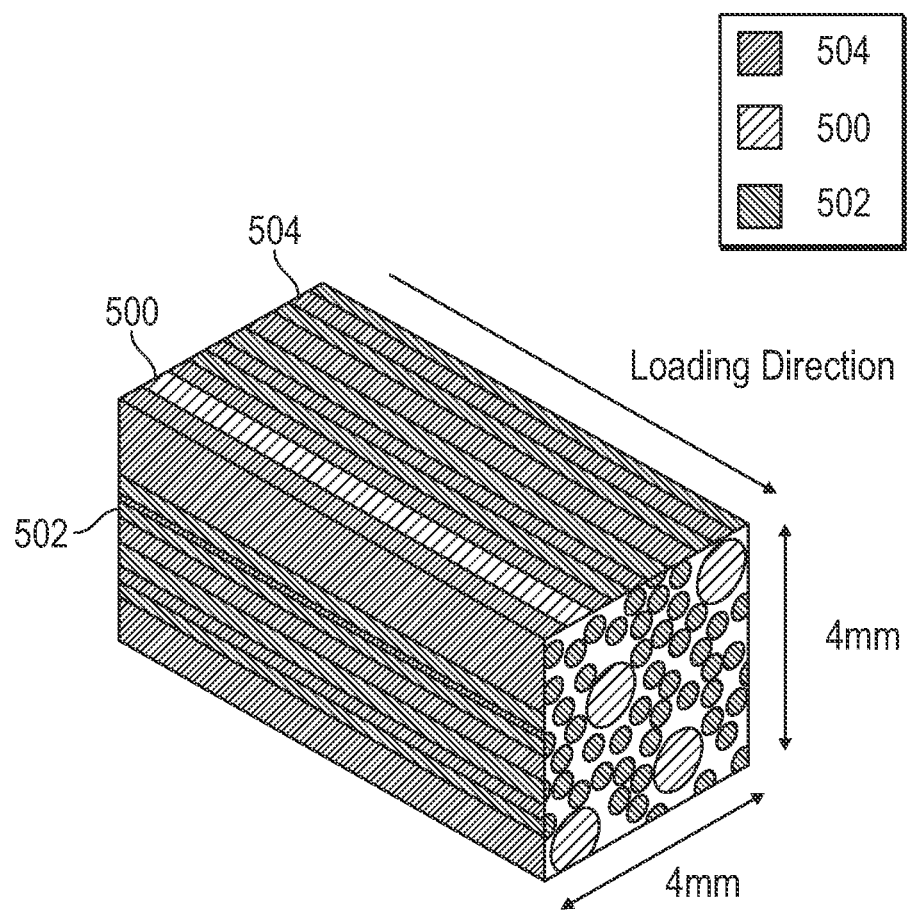
FIG. 5 is an illustration of the microstructure of a HD-FRP of sample 1.

FIG. 5 is a 3D representative volume element of the rebar of sample #1 comprising of 18.2% vol. carbon fiber 500, 39.0% vol. UHMWPE 502, and 42.8% vol. vinyl ester resin 504. FIG. 5 is a 3D representative volume element (RVE) of the composite that was used to simulate the three-phase material of the hybrid rebars. Periodic boundaries conditions, periodic geometry, and nonlinear material constitutive laws with damage laws are used to accurately represent real conditions.]

Figure 6:
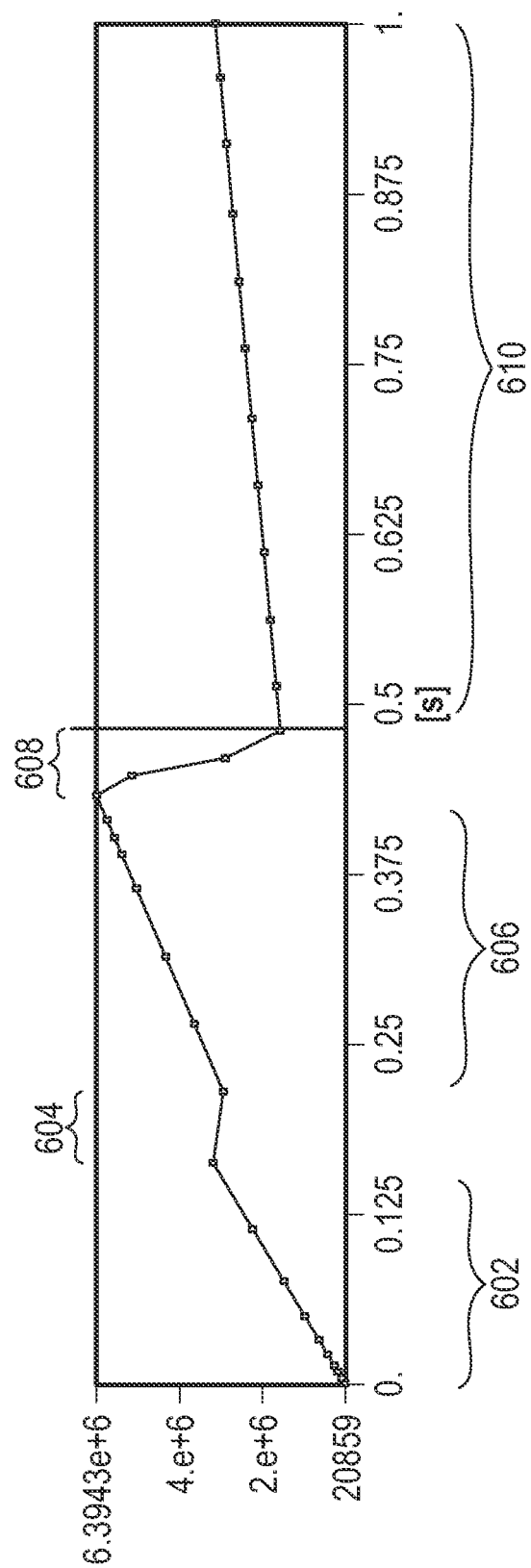
FIG. 6 is a simulated force versus time chart of sample 1.

FIG. 6 is a simulated stress-strain response of sample 1 with visible ductility and volume participation of each phase in sample 1. The data in FIG. 6 was obtained by recording the reaction force resulting from a displacement imposed to a face perpendicular to the fiber axis. FIG. 5 illustrates simulated force verses time charts obtained from a rebar composition of sample #1. Specifically, the plot shows a softening in the composite response due to the failure of one part of the reinforcements. FIG. 6 shows the five stages of the composite virtual tensile test at different times. Specifically, FIG. 6 initially shows a linear behavior up to the failure of carbon fibers 602 (where the failure occurs when the analysis is 16% complete), followed by the rupture of carbon fibers, which causes a drop of stiffness and generates a reaction force 604. At 21% completion of the analysis, the UHMWPE fibers are progressively taking the load and provide stiffness to the material; hence, the reaction force increases 606. This continues until the UHMWPE fiber ruptures 608 (from 21% to 43% of analysis time). At 48% of analysis time, both the carbon and UHMWPE fibers have failed and provide only residual stiffness and strength to the composite. Finally, the remaining reaction force 610 is due to stiffness from the resin and ruptured fibers in the composite.

The HD-FRP of one or more embodiments is unique in its structural composition. Specifically, the HD-FRP may include three components instead of two in normal composites; two types of reinforcing fiber and one polymer resin. The properties of the HD-FRP may be tuned by varying the content of each constituent. This type of customizable rebar may lead to more freedom in the architectural design, as the latter will not be restrained to the available options (GFRP, CFRP or steel rebar) and a specific rebar can be designed and manufactured to optimally serve the architectural design.

The disclosed co-pultrusion process described herein has multiple advantages over pultrusion to make fiber reinforced rebars. For instance, unlike pultrusion, in co-pultrusion it is relatively easy to maintain a specific tension on each type of the fiber to ensure that when the rebar is used to reinforce concrete, there are no residual strains resulting from the shrinkage. This control cannot be effectively dealt with in simple pultrusion. As a result, compared to simple pultrusion, where both fibers are held under the same tension, a difference in stiffness between the two fibers might result in a difference in strain in the final rebar which would impact the final performance of the rebar. Another benefit of co-pultrusion is that it enables control over the distribution of the two fibers within and across the rebar to optimize the load distribution.

Notably, the disclosed HD-FRP rebars have better ductility and elongation that will reduce the use of steel rebars and the weight of building structures. The superior ductility provided by the disclosed HD-FRP rebars may possibly result in increased safety of buildings, resulting in a reduction in construction costs.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method of forming a rebar composition, comprising:
   feeding a first fiber and a second fiber simultaneously into a resin impregnator, thereby forming a hybrid fiber, wherein the first and second fibers are different;
   pulling the fibers through a liquid polymeric resin in the resin impregnator to form a resin- soaked hybrid fiber; and
   passing the resin-soaked hybrid fiber through a heated stationary die, where resin of the resin- soaked hybrid fiber undergoes polymerization and cross-linking to form a fiber reinforced polymer rebar,
   wherein a polymer is present in the fiber reinforced polymer rebar in an amount ranging from 35 to 43 wt % based on a total weight of the rebar wherein the rebar has a ductility ratio of at least 30% greater than a reference rebar comprising of one fiber.

2. The method of claim 1, wherein at least one of the first fiber and the second fiber is passed through an atmospheric plasma treatment chamber prior to being fed to the resin impregnator.

3. The method of claim 1, wherein the polymer of the fiber reinforced polymer rebar is a thermoset polymer or thermoplastic polymer.

4. The method of claim 1, wherein the liquid polymer resin is selected from the group consisting of a vinyl ester, a polymethyl methacrylate, and combinations thereof.

5. The method of claim 1, wherein the first fiber is an ultra-high molecular weight polyethylene.

6. The method of claim 1, wherein the second fiber is selected from the group consisting of a carbon fiber, a glass fiber, and combinations thereof.

7. The method of claim 1, wherein the first fiber is present in the fiber reinforced polymer rebar in an amount ranging from 30 to 55 wt % based on total weight of the rebar.

8. The method of claim 1, wherein the second fiber is present in the fiber reinforced polymer rebar in an amount ranging from 2 to 35 wt % based on total weight of the rebar.

9. The method of claim 1, wherein the first fiber and the second fiber are passed through a preforming guide prior to the feeding step.

10. The method of claim 9, wherein an arrangement of holes of the preforming guide determines an arrangement of fibers in the fiber reinforced polymer rebar.

11. The method of claim 1, wherein the heated die is at a temperature ranging from 80° C. to about 150° C.

12. The method of claim 1, wherein the first fiber to the second fiber ratio is in an amount ranging from 1:1 to 4:1.

* * * * *